Figure 1:
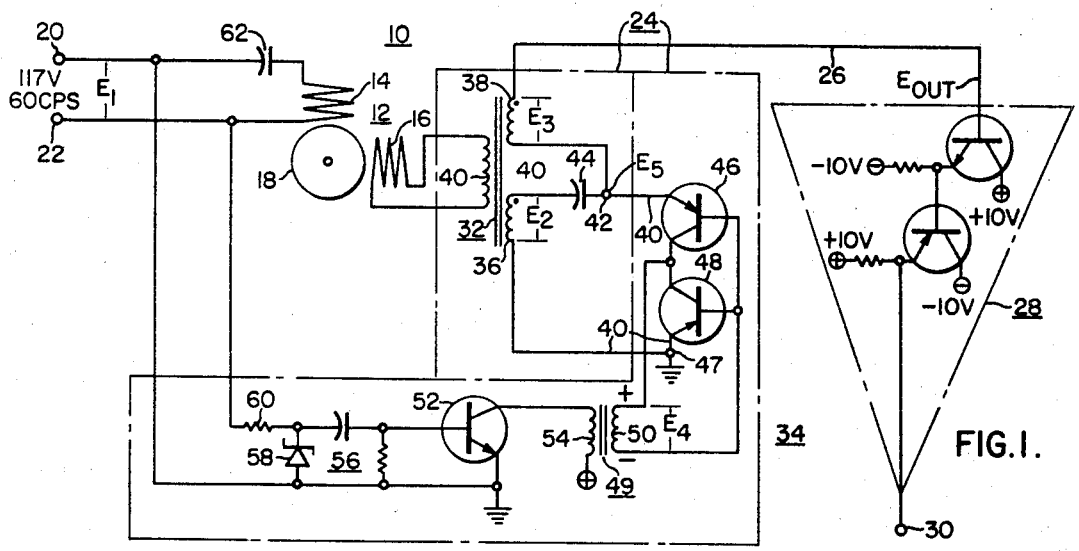

Oct. 15, 1968

J. GILL ET AL 3,406,317

DIRECT CURRENT TACHOMETER SYSTEM

Filed Nov. 14, 1966

WITNESSES:
Theodore F. Wrobel
James F. Young

INVENTORS
Joseph Gill
and George Rouvalis
BY E. F. Possecky
ATTORNEY

United States Patent Office 3,406,317
Patented Oct. 15, 1968

3,406,317
DIRECT CURRENT TACHOMETER SYSTEM
Joseph Gill, Bridgeville, and George Rouvalis, Pittsburgh, Pa., assignors to Westinghouse Electric Corporation, Pittsburgh, Pa., a corporation of Pennsylvania
Filed Nov. 14, 1966, Ser. No. 593,831
10 Claims. (Cl. 317—5)

The present invention relates to speed sensing systems and more particularly to direct current tachometer systems.

In generating a signal representative of the speed of a machine such as an electric motor, it is often desirable in feedback control and other applications to provide the speed signal in the form of a direct current signal. Further it is often generally undesirable from brush maintenance and operating reliability standpoints to employ a direct current tachometer for direct generation of the direct current speed signal. Instead, an alternating current tachometer generator can be employed to provide brushless generation of an alternating current speed signal and circuitry can be used to translate the alternating current speed signal to a direct current speed signal.

Conventional diode rectification will produce the required translation of the alternating current signal. However, filtering circuitry which is needed to reduce rippling materially extends the tachometer time response and accordingly makes the rectifier tachometer system unsuitable for applications such as feedback control systems where stable and fast overall system time response is required.

Additional performance factors are also important in the conceptual process of devising a fast response direct current tachometer system. Since tachometer system operation is essentially a measuring process, accuracy is clearly a primary consideration. As an incident of accuracy, it is desirable although not always necessary that a direct current output signal be substantially independent of the Fourier make-up of the periodic alternating current tachometer waveform. Another important performance rating factor is phase sensitivity since it is often advantageous for a direct current tachometer system to indicate inherently the direction of rotation of the machine with which it is associated.

In accordance with the broad principles of the present invention, a direct current tachometer system is efficiently and economically arranged to operate reliably without brushes and to produce a D.C. speed signal accurately with fast response and phase sensitivity. It includes an alternating current tachometer generator which produces an A.C. output signal having an amplitude that varies accurately as a predetermined function of generator speed. Means are provided for biasing the A.C. signal in relation to a predetermined reference potential so that a predetermined A.C. waveform reference value such as the average A.C. waveform value is at a D.C. bias value dependent on an A.C. signal amplitude property such as the A.C. signal peak amplitude. The A.C. components are subtracted from the biased A.C. signal to produce an output D.C. signal with fast response and with an amplitude dependent on the generator speed. To provide phase sensitivity, the D.C. bias value for the A.C. waveform and the output D.C. signal have a polarity controlled by the direction of generator rotation.

It is therefore an object of the invention to provide a novel direct current tachometer system which operates with generally improved porformance.

Another object of the invention is to provide a novel direct current tachometer system which operates without brushes and with improved reliability and low maintenance requirements.

A further object of the invention is to provide a novel direct current tachometer system which operates without brushes and includes solid state circuitry to be characterized with high performance and high reliability compatible with high system performance and reliability specifications of solid state feedback control systems or the like.

An additional object of the invention is to provide a novel direct current tachometer system which operates with improved time response and thus is particularly useful in feedback control systems requiring fast ssytem response.

It is another object of the invention to provide a novel direct current tachometer system which is efficiently and economically organized to operate accurately and reliably with fast time response.

It is a further object of the invention to provide a novel direct current tachometer system which operates substantially independently of the waveform of the output of an alternating current tachometer generator employed therein.

It is an additional object of the invention to provide a novel direct current tachometer system which operates with phase sensitivity.

Figure 2:
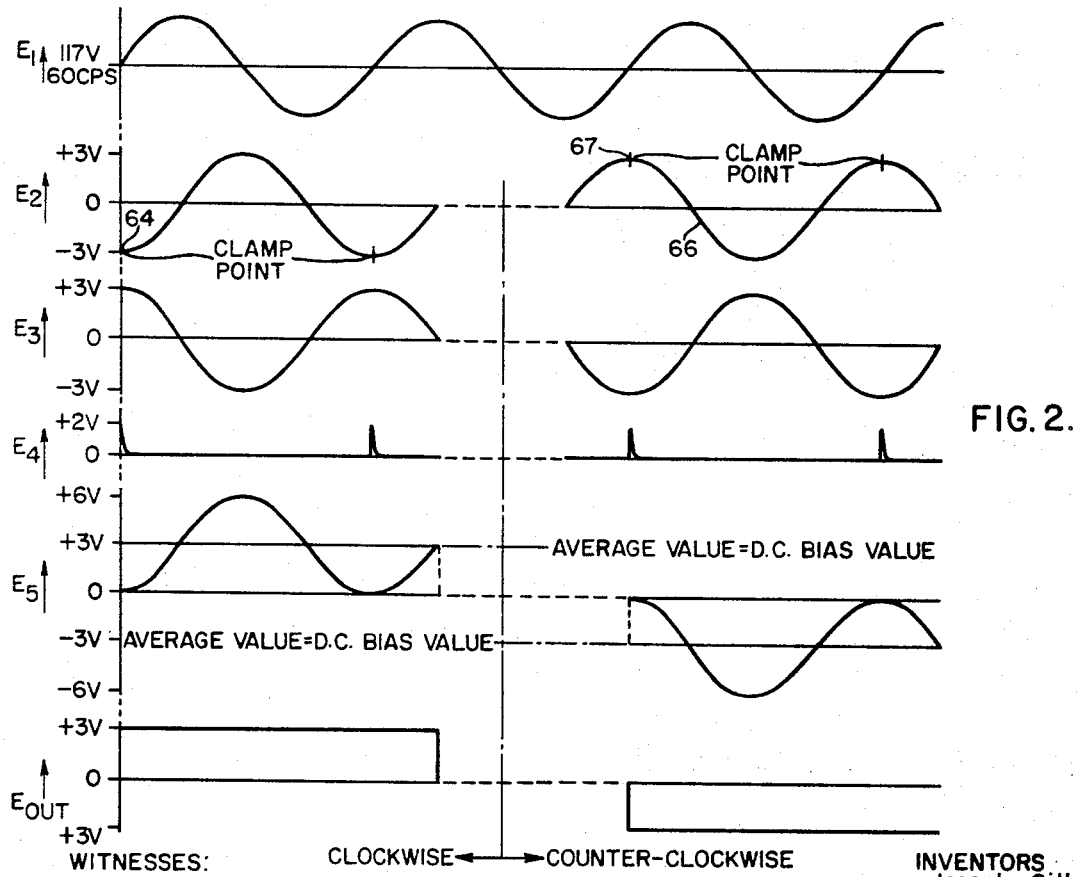

These and other objects of the invention will become more apparent upon consideration of the following detailed description along with the attached drawing, in which:

FIGURE 1 shows a schematic diagram of a direct current tachometer system arranged in accordance with the principles of the invention; and FIG. 2 shows a series of voltage waveforms at certain significant points in the system of FIG. 1.

More specifically, there is shown in FIG. 1 a direct current tachometer system 10 including an alternating current tachometer generator 12 which is preferably in the form of a conventional two phase alternating current motor connected in a generator mode of operation. Thus, a first stator winding 14 operates as a primary winding and a second stator winding 16 operates as a secondary winding. Electromagnetic coupling between the stator windings 14 and 16 is substantially provided through a rotor 18 which is mechanically coupled to a machine (not shown) to be driven thereby for speed sensing purposes. Since the alternating current tachometer 12 operates without brushes, a foundation is provided for operating reliability and low maintenance requirements for the direct current tachometer system 10. In practicing the invention, alternating current tachometer generator types other than the type shown and described can be employed.

In operation, a source voltage $E_1$ (FIG. 2) is applied to the tachometer primary winding 14 through input terminals 20 and 22. The source voltage $E_1$ is preferably a sinusoidal waveform having a predetermined RMS value such as 117 volts and a predetermined frequency such as 60 c.p.s. With the application of the source voltage $E_1$ to the tachometer primary winding 14, there is induced in the tachometer secondary winding 16 in a manner well known in the pertaining art a substantially sinusoidal voltage having the source frequency and a substantially reduced amplitude which varies as an accurate function of the tachometer rotor speed. Normally, A.C. output voltage from the tachometer 12 would vary as a substantially linear function of the tachometer rotor speed and would typically have a peak amplitude of 2 to 3 volts on the high side of the speed measuring range. As will be explained more fully subsequently the A.C. tachometer output voltage can have a waveform other than sinusoidal substantially without affecting the operation of the direct current tachometer system 10.

A circuit 24 is coupled to the output winding 16 of the alternating current tachometer generator 12 for the purpose of translating the tachometer A.C. output signal to an accurate D.C. speed signal while introducing only nominal or negligible time delay. Thus, a D.C. output signal from the translating circuit 24 as indicated by the reference character 26 varies accurately in amplitude as a function of the tachometer rotor speed. Preferably, the output of the translating circuit 24 is coupled to a high input impedance buffer amplifier 28 to minimize loading on the circuit 24 while producing a high power level output D.C. speed signal at an output terminal 30.

In general, the translating circuit 24 accurately translates the tachometer A.C. output signal to the D.C. speed signal 26 by biasing the A.C. signal in relation to a predetermined reference potential so that a predetermined A.C. waveform reference value is at a D.C. bias value dependent on an A.C. signal amplitude property. To achieve fast response, it is preferred that the average value of each cycle in the A.C. waveform be set at a D.C. bias value dependent on the A.C. signal peak amplitude in that cycle. Further, the A.C. components in each cycle of the A.C. waveform are subtracted from the biased A.C. signal to produce the output D.C. speed signal with an amplitude dependent on the generator speed. The polarity of the D.C. bias value and the output D.C. speed signal are controlled by the direction of generator rotation to provide phase sensitivity for the direct current tachometer system 10. Time response for the tachometer system is fast particularly since no filtering impedance or the like is required for system operation.

To translate the tachometer A.C. output signal to the D.C. speed signal 26, it is preferred that the circuit 24 include a double secondary transformer 32 and a clamping circuit 34. In the transformer 32, first and second secondary windings 36 and 38 are preferably substantially identical so that substantially identical waveforms $E_2$ and $E_3$ (FIG. 2) are induced therein when the tachometer A.C. output signal is applied to primary winding 40 of the transformer 32.

The transformer secondary winding 36 is connected in a clamping circuit loop 40 to establish a D.C. biased waveform $E_5$ (FIG. 2) corresponding to the tachometer A.C. output waveform. Since the peak amplitude of the tachometer A.C. output waveform varies from cycle to cycle in accordance with the tachometer rotor speed, the peak amplitude dependent D.C. bias value established for the $E_5$ waveform also varies with the tachometer speed.

In the clamping loop 40, the D.C. biased waveform $E_5$ is established at a bias junction 42 on one side of a capacitor 44 which is series connected with the transformer secondary winding 36 and a pair of clamping circuit switches preferably in the form of reverse connected transistors 46 and 48. In this instance, the reference potential for the D.C. bias value is ground or zero potential as indicated by the reference character 47.

In order to equate the D.C. bias value with the peak amplitude of the tachometer A.C. signal during each cycle of operation and thereby lay a foundation for extremely fast tachometer system time response, the bias junction 42 is brought substantially to ground potential once each cycle for a brief clamping time period during which the A.C. signal across the transformer secondary winding 36 is peaking. The periodic ground clamping is produced by the transistors 46 and 48 which become conductive simultaneously during each of the successive brief clamping time periods. As shown in FIG. 2, a short duration clamping pulse $E_4$ occurs once each cycle to provide the transistor switching control required for ground clamping of the junction 42 at the indicated peak time points of the transformer secondary waveform $E_2$ in both the clockwise and counterclockwise directions of tachometer rotation.

During each brief clamping time period, the capacitor 44 is charged by clamping loop current substantially to the peak $E_2$ voltage then existing across the transformer secondary winding 36. The total voltage added to or subtracted from the capacitor 44 from cycle to cycle can be relatively large or small depending on the rate of change of tachometer speed and output voltage amplitude. Between clamping time periods, no current flows in the clamping loop 40 and the potential at the bias junction 42 therefore is then equal to the D.C. voltage developed across the capacitor 44 in the next preceding clamping time period plus the alternating voltage $E_2$ across the transformer secondary winding 36. As indicated by the waveform $E_5$ in FIG. 2, the potential at the bias junction 42 is thus a fluctuating voltage which follow the fluctuating transformer secondary voltage $E_2$ and which has an average or D.C. bias value equal in each cycle to the peak $E_2$ voltage in the next preceding clamping time period. The D.C. bias value then follows changes in the peak amplitude of the voltage $E_2$ at the rate of once each cycle to provide fast circuit response. For example, if the input voltage $E_1$ has a frequency of 60 c.p.c., a maximum delay of 8 milliseconds occurs between a change in tachometer speed and a corresponding change in the D.C. bias potential at the junction 42.

To produce a D.C. output signal $E_{OUT}$ equal to the D.C. bias value, the transformer secondary winding 38 is series connected between the bias junction 42 and the input terminal of the buffer amplifier 28. The secondary winding 38 is reverse connected in relation to the secondary winding 36 so that A.C. components are subtracted from the D.C. biased waveform. Thus, as shown in FIG. 2, voltage $E_3$ across the secondary winding 38 is 180° out of phase with the voltage $E_2$ across the secondary winding 36.

Since the A.C. components in the two secondary voltages $E_2$ and $E_3$ are cancelled in generating $E_{OUT}$, it is clear that the D.C. tachometer system 10 can be made to function properly even if a non-sinusoidal working waveform is produced by the A.C. tachometer generator 12. In practice, the greatest advantage of this feature normally stems from the fact that interpeak irregularities produced in a generally sinusoidal A.C. tachometer output have little or no effect on the accuracy of the system.

As previously indicated, the buffer amplifier 28 amplifies the D.C. output signal $E_{OUT}$ to a higher power level at the output terminal 30. In order to minimize loading on the bias junction 42 and thereby minimize decay in the bias capacitor voltage and the junction bias voltage between clamping time periods, the input impedance of the amplifier 28 is relatively high. As illustrated, the buffer amplifier 28 can be a conventional two stage emitter follower transistor amplifier to meet the power amplification and input impedance needs.

The pulses $E_4$, which periodically effect ground clamping of the bias junction 42, are periodically generated across a secondary winding 50 of a transformer 49 and applied across the collector and base terminals of the reverse connected clamping transistors 46 and 48. Collector-base drive currents during the short clamping pulse duration cause the transistors 46 and 48 to become conductive thereby clamping the bias junction 42 substantially at ground potential and allowing charging current to flow in the clamping loop 40 to develop the D.C. bias voltage on the capacitor 44 at a value substantially equal to the peak $E_2$ voltage value then existing across the transformer secondary 36. When the clamping pulse $E_4$ terminates, the path through the transistors 46 and 48 to ground becomes non-conductive and the potential at the bias junction 42 is determined in the manner previously described.

The reverse connected clamping transistors 46 and 48 are connected in an inverted arrangement in order to provide clamping potential accuracy. Thus, since the transistors 46 and 48 are made conductive by collector-base drive current, small emitter-collector voltage drops exist during the conduction state of the transistors. For example, an emitter-collector voltage drop as small as 1 millivolt is produced as opposed to an emitter-collected voltage drop as great as 0.2 volt or more when the more usual base-emitter drive is used for transistor switching control. Since the emitter-collector voltage drops are small, the clamp circuit 24 is characterized with the added advantage of relatively high temperature stability.

As already indicated the clamping transistors 46 and 48 are reverse connected which results in emitter-collector drops having opposite polarities and therefore tending to cancel particularly if matching transistors are selected for use. With the reverse connection of the clamping transistors 46 and 48, a further advantage is realized in that one of the two transistors is always blocked in the time span between clamping time periods to prevent clamp loop current flow in that time span irrespective of the potential of the bias junction 42 in relation to ground. There is accordingly no need for auxiliary reverse biasing circuitry as would be required if a single transistor were used to provide the clamping switch function.

The clamping pulses $E_4$ are generated when a transistor 52 is made conductive to allow a current pulse in a primary winding 54 of the transformer 49. Base-emitter drive is provided for the transistor 52 by an RC differentiating circuit 56 which is supplied with voltage from a Zener diode 58 connected to the source voltage $E_1$ through a current limiting resistor 60. Each time the voltage $E_1$ passes through zero from a negative to a positive value, the transistor 52 is briefly forward biased to produce an $E_4$ pulse as current flows through the differentiating circuit resistor during voltage reversal across the differentiating circuit capacitor. Typically, the $E_4$ pulses would have a duration of 50 microseconds for a 60 c.p.s. $E_1$ waveform.

In order to cause the $E_4$ pulses to be generated at the preferred points of the $E_2$ waveform, a phase shift of substantially 90° is provided between the $E_1$ waveform and the $E_2$ waveform. In this case, the phase shift is provided by a capacitor 62 connected in series with the tachometer primary winding 14 and the input terminal 20. The voltage across the winding 14, and by extension the voltage $E_2$, thus lags $E_1$ by substantially 90°. Since the $E_4$ pulses occur at $E_1$ zero points, clamping is produced at the peak points of the $E_2$ waveform.

As shown in FIG. 2, clockwise tachometer rotation results in clamping at negative peaks 64 of the $E_2$ waveform so that a positive D.C. bias is produced at the junction 42. When the tachometer 12 is rotated in a counterclockwise direction, the $E_2$ voltage is phase shifted by 180° as indicated by the curve 66 since the tachometer output voltage is phase shifted by 180°. Clamping then occurs at positive peaks 67 of the $E_2$ waveform to produce a negative D.C. bias at the junction 42. Since the D.C. output signal $E_{OUT}$ follows the amplitude and polarity of the D.C. bias at the junction 42, the direct current tachometer system 10 advantageously operates with tachometer phase sensitivity and inherently indicates the direction of tachometer rotation.

In summary, the direct current tachometer system 10 is arranged economically and efficiently to provide a D.C. speed signal reliably by means of solid state circuitry and a brushless tachometer generator. The system operates accurately with fast time response and with inherent phase sensitivity. It is useful in a variety of applications and particularly in feedback control applications where fast and accurate and reliable response is required.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A direct current tachometer system comprising an alternating current tachometer device generating an A.C. output signal having an amplitude which varies as a function of tachometer speed, means for biasing the A.C. output signal so that a predetermined waveform reference value of the A.C. output signal is at a D.C. bias value dependent on an amplitude property of the A.C. output signal, and means for removing the fluctuating components of the biased A.C. signal so as to produce a D.C. speed signal.

2. A direct current tachometer system as set forth in claim 1 wherein said biasing means controls the bias polarity in accordance with the direction of tachometer rotation.

3. A direct current tachometer system as set forth in claim 1 wherein the predetermined waveform reference value is the average A.C. waveform value and the amplitude property is the peak signal amplitude.

4. A direct current tachometer system as set forth in claim 3 wherein means are provided for setting the D.C. bias value once during each cycle of the A.C. output signal.

5. A direct current tachometer system as set forth in claim 1 wherein a transformer is coupled to the output of said tachometer device, said transformer having a primary winding and a pair of substantially identical secondary windings, a clamp circuit loop including a bias capacitor connected in series with one of said secondary windings, means for periodically and briefly clamping a point in said loop to a reference potential to enable said capacitor to charge substantially to the voltage existing across said one winding during the clamping time period, the other transformer secondary winding connected between said loop clamp point and a high impedance load.

6. A direct current tachometer system as set for in claim 5 wherein the predetermined waveform value is the average A.C. waveform value and the amplitude property is the peak signal amplitude and wherein said loop point is clamped once during each cycle of the A.C. output signal.

7. A direct current tachometer system as set forth in claim 6 wherein said clamping means includes a solid state switching circuit connected in said loop, and means for controlling said switching circuit to provide a conductive path between said loop clamp point and the reference potential substantially at a peak point in each cycle of the voltage across said one transformer secondary winding.

8. A direct current tachometer system as set for in claim 7 wherein said tachometer device is in the form of a two phase motor having a primary stator winding coupled to said transformer primary winding, said switch controlling means operable in response to the source voltage to generate a clamping switch circuit drive pulse at a source voltage zero crossover point once each cycle, and a capacitor connected in series with said primary stator winding to shift the phase of the voltage across said one transformer secondary winding by substantially 90° from the source voltage thereby enabling peak clamping to be produced and enabling the polarity of the D.C. bias value to be determined by the polarity of the peak clamp voltage thereby sensing the direction of tachometer rotation.

9. A direct current tachometer system as set forth in claim 7 wherein said switching circuit includes a pair of transistors connected reversely in an inverted arrangement for collector-emitter path control in said clamping loop in response to collector-base drive current supplied by said controlling means.

10. A direct current tachometer system as set forth in claim 5 wherein there is provided a high input impedance buffer amplifier, said other transformer secondary winding connected to an input of said buffer amplifier.

References Cited

UNITED STATES PATENTS

| | | | |
|---|---|---|---|
| 2,958,038 | 10/1960 | Kwast | 318—326 X |
| 3,238,383 | 3/1966 | Falk | 321—8 X |

LEE T. HIX, *Primary Examiner.*

W. H. BEHA, JR., *Assistant Examiner.*